US009958922B2

(12) United States Patent
Matthew et al.

(10) Patent No.: US 9,958,922 B2
(45) Date of Patent: May 1, 2018

(54) LOW RIPPLE MECHANISM OF MODE CHANGE IN SWITCHED CAPACITOR VOLTAGE REGULATORS

(71) Applicant: Intel Corporation, Santa Clara, CA (US)

(72) Inventors: George E. Matthew, Hillsboro, OR (US); Rinkle Jain, Portland, OR (US); Vaibhav Vaidya, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days. days.

(21) Appl. No.: 15/589,656

(22) Filed: May 8, 2017

(65) Prior Publication Data

US 2017/0242468 A1    Aug. 24, 2017

Related U.S. Application Data

(63) Continuation of application No. 14/866,662, filed on Sep. 25, 2015, now Pat. No. 9,680,363.

(51) Int. Cl.
| | | |
|---|---|---|
| *H02M 3/07* | (2006.01) | |
| *G06F 1/28* | (2006.01) | |
| *H02M 3/156* | (2006.01) | |
| *G05F 1/40* | (2006.01) | |
| *G06F 1/26* | (2006.01) | |
| *G05F 1/10* | (2006.01) | |
| *G05F 3/08* | (2006.01) | |
| *G05F 1/32* | (2006.01) | |

(52) U.S. Cl.
CPC .............. *G06F 1/28* (2013.01); *G05F 1/10* (2013.01); *G05F 1/32* (2013.01); *G05F 1/40* (2013.01); *G05F 3/08* (2013.01); *G06F 1/26* (2013.01); *H02M 3/07* (2013.01); *H02M 3/156* (2013.01)

(58) Field of Classification Search
CPC ..... G06F 1/28; G05F 1/10; G05F 1/32; G05F 1/40; G05F 3/08; G05F 1/26; H02M 3/07; H02M 3/156
See application file for complete search history.

(56) References Cited

U.S. PATENT DOCUMENTS

| 6,040,725 A | 3/2000 | Robert et al. |
|---|---|---|
| 6,150,847 A | 11/2000 | Lu, Jr. |

(Continued)

FOREIGN PATENT DOCUMENTS

WO    2017/052742 A1    3/2017

OTHER PUBLICATIONS

International Search Report and Written Opinion received for International Application No. PCT/US2016/043710, dated Oct. 26, 2016, 11 pages.

(Continued)

*Primary Examiner* — Emily P Pham
(74) *Attorney, Agent, or Firm* — Spectrum IP Law Group LLC (57) ABSTRACT

Methods and apparatus relating to a low ripple mechanism of mode change in switched capacitor voltage regulators are described. In an embodiment, a mode change of a Switching Capacitor Voltage Regulator (SCVR) is caused based at least in part on a comparison of an output voltage of the SCVR and a reference voltage. The output voltage is sensed based at least in part on a clock signal. Other embodiments are also disclosed and claimed.

20 Claims, 7 Drawing Sheets

(56) References Cited

U.S. PATENT DOCUMENTS

| | | | |
|---|---|---|---|
| 6,927,441 B2 | 8/2005 | Domenico et al. | |
| 8,423,800 B2 * | 4/2013 | Huang | G05F 3/02 |
| | | | 713/300 |
| 8,582,333 B2 | 11/2013 | Oraw et al. | |
| 8,861,233 B2 | 10/2014 | Marsili et al. | |
| 9,557,354 B2 * | 1/2017 | Chen | H03K 5/24 |
| 9,680,363 B2 | 6/2017 | Matthew et al. | |
| 2005/0270003 A1 | 12/2005 | Floyd et al. | |
| 2009/0072800 A1 | 3/2009 | Ramadass et al. | |
| 2010/0214015 A1 | 8/2010 | Takasawa et al. | |
| 2010/0231326 A1 | 9/2010 | Afshin et al. | |
| 2011/0304306 A1 | 12/2011 | Galal et al. | |
| 2012/0293254 A1 | 11/2012 | Hui et al. | |
| 2013/0241518 A1 * | 9/2013 | Huang | H02M 3/07 |
| | | | 323/304 |
| 2014/0006808 A1 | 1/2014 | Sizikov et al. | |
| 2015/0022169 A1 * | 1/2015 | Cannankurichi Vijaya Mohan | H02M 3/07 |
| | | | 323/282 |
| 2015/0236583 A1 | 8/2015 | David et al. | |
| 2017/0093270 A1 | 3/2017 | Matthew et al. | |

OTHER PUBLICATIONS

Notice of Allowance received for U.S. Appl. No. 14/866,662, dated Feb. 16, 2017, 5 pages.
Office Action received for U.S. Appl. No. 14/866,662, dated Sep. 28, 2016, 11 pages.

* cited by examiner

LOW RIPPLE MECHANISM OF MODE CHANGE IN SWITCHED CAPACITOR VOLTAGE REGULATORS

RELATED APPLICATIONS

This application is a continuation and claims priority under 35 U.S.C. § 120 of pending U.S. patent application Ser. No. 14/866,662, filed Sep. 25, 2015, entitled LOW RIPPLE MECHANISM OF MODE CHANGE IN SWITCHED CAPACITOR VOLTAGE REGULATORS. The entire disclosure of these documents are incorporated by reference herein for all purposes.

FIELD

The present disclosure generally relates to the field of electronics. More particularly, some embodiments relate to a low ripple mechanism of mode change in switched capacitor voltage regulators.

BACKGROUND

Voltage Regulators (VRs) are generally used in power delivery applications in which an input voltage needs to be transformed to an output voltage in a ratio that can be both smaller and larger than unity. One type of such VRs is called a Switching Capacitor Voltage Regulator (SCVR). SCVRs can be used in some designs (e.g., because they do not include inductors), but SCVRs may cause voltage spikes during operational mode changes.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

As discussed above, SCVRs can be used in some designs (e.g., because they do not include inductors), but SCVRs may cause voltage spikes during operational mode changes. Generally, SCVRs can be used for on-die power delivery as they are more efficient than LDO (Low DropOut) voltage regulators and do not have inductors unlike buck regulators. SCVRs can operate in 2:1, 3:1 and 3:2 step down modes, depending on input and output voltages. And, for DFVS (Dynamic Frequency and Voltage Scaling) implementations, SCVRs need to frequently change their operating mode.

To this end, some embodiments provide a low ripple mechanism of mode change in SCVRs. One embodiment provides a switching control mechanism/logic to avoid (or at least reduce) any voltage (or current) spikes on the capacitor voltage (or current), as well as the output voltage (or output current). Moreover, when utilizing SCVRs, except for comparator offset and switching time, the output voltage is generally above the VID (Voltage Identification Digital, which is the reference voltage). This can occur when the output decoupling capacitance is reduced—a relatively common occurrence with SCVR implementation. Furthermore, on-die capacitance with metal layers (such as a capacitor with Metal Insulator Metal (MIM) layers) is usually used for output decoupling capacitance; however, if an SCVR is implemented with MIM, on-die capacitance may be reduced. Furthermore, an embodiment provides a technique for automatically or dynamically changing the mode of an SCVR based on the switching frequency of the SCVR (and/or the switching control logic/mechanism).

Figure 1:
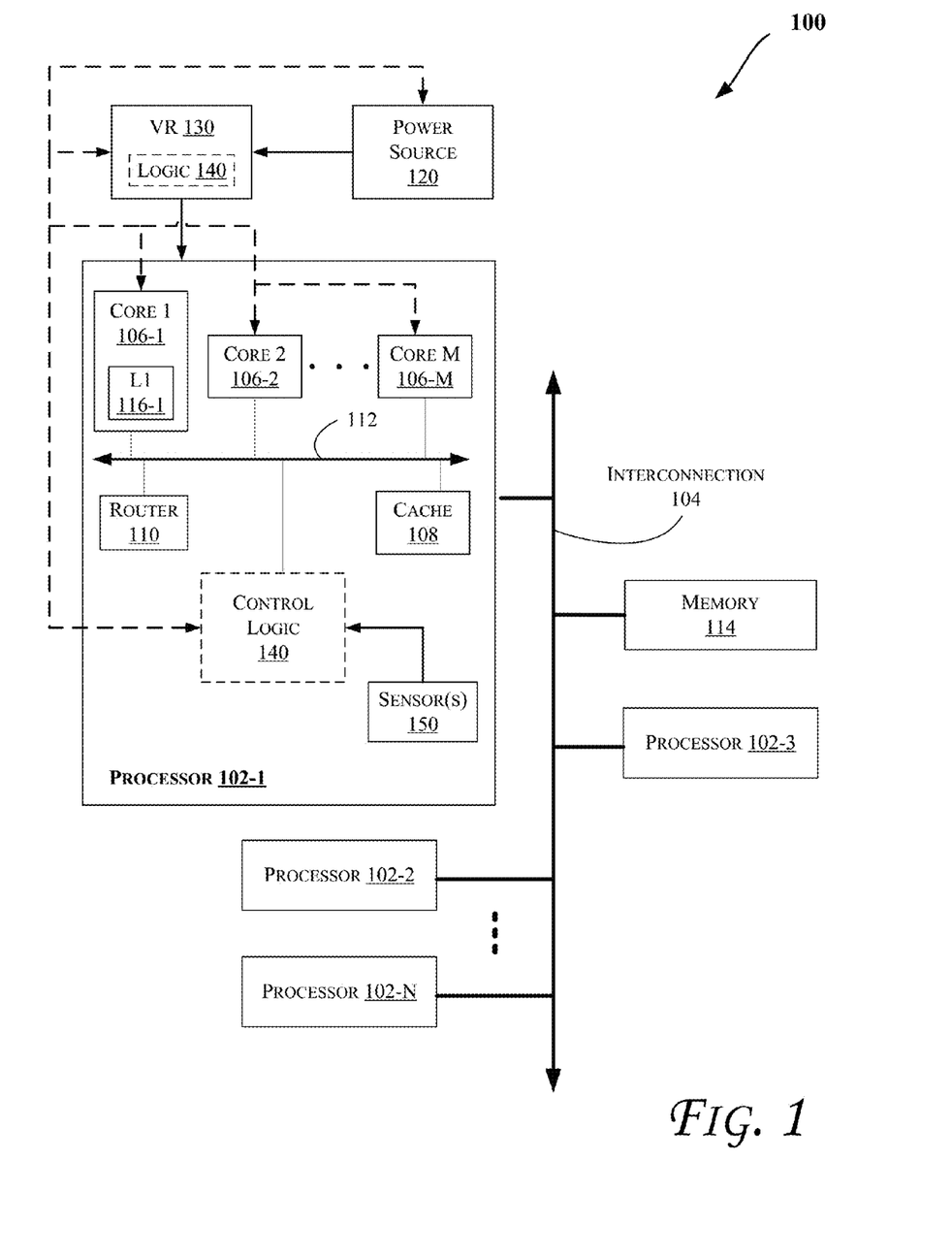
FIGS. 1, 5, 6, and 7 illustrate block diagrams of embodiments of computing systems, which may be utilized to implement various embodiments discussed herein.

Additionally, some embodiments may be applied in computing systems that include one or more processors (e.g., with one or more processor cores), such as those discussed with reference to FIGS. 1-7, including for example mobile computing devices such as a smartphone, tablet, UMPC (Ultra-Mobile Personal Computer), laptop computer, Ultrabook™ computing device, smart watch, smart glasses, wearable devices, etc., and/or larger systems such as computer servers with many cores, etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 5-7), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a platform power source 120 (e.g., a Direct Current (DC) power source or an Alternating Current (AC) power source) to provide power to one or more components of the system 100. The power source 120 could include a PV (Photo Voltaic) panel, wind generator, thermal generator water/hydro turbine, etc. In some embodiments, the power source 120 may include one or more battery packs (e.g., charged by one or more of a PV panel, wind generator, thermal generator water/hydro turbine, plug-in power supply (for example, coupled to an AC power grid), etc.) and/or plug-in power supplies. The power source 120 may be coupled to components of system 100 through a Voltage Regulator (VR) 130 (which may be an on-die VR in some embodiments such as an SCVR). Moreover, even though FIG. 1 illustrates one power source 120 and a single voltage regulator 130, additional power sources and/or voltage regulators may be utilized. For example, one or more of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores).

Additionally, while FIG. 1 illustrates the power source 120 and the voltage regulator 130 as separate components, the power source 120 and the voltage regulator 130 may be incorporated into other components of system 100. For example, all or portions of the VR 130 may be incorporated into the power source 120 and/or processor 102.

As shown in FIG. 1, the processor 102 may further include a power control logic 140 (which may be implemented in or as a Power Management Unit (PMU) for example) to control mode of operation and/or supply of power to components of the processor 102 (e.g., cores 106). Logic 140 may support a low ripple mechanism of mode change in a SCVR (e.g., VR 130) as discussed herein. In an embodiment, logic 140 is provided on a reprogrammable power management IC (RPMIC). Such RPMIC implementation may be used in low power devices (such as portable devices discussed herein) through large computer servers such as discussed herein with reference to FIG. 1 or 5-7.

Further, logic 140 may have access to one or more storage devices discussed herein (such as cache 108, L1 cache 116, memory 114, or another memory in system 100) to store information relating to operations of logic 140 such as information communicated with various components of system 100 as discussed here. As shown, the logic 140 may be coupled to the VR 130 and/or other components of system 100 such as the cores 106 and/or the power source 120. Also, logic 140 may be provide elsewhere in system 100, such as within the VR 130.

Additionally, the logic 140 may be coupled to receive information (e.g., in the form of one or more bits or signals) to indicate status of one or more sensors 150. The sensor(s) 150 may be provided proximate to components of system 100 (or other computing systems discussed herein such as those discussed with reference to other figures including 5-7, for example), such as the cores 106, interconnections 104 or 112, components outside of the processor 102, etc., to sense variations in various factors affecting power/thermal behavior of the system/platform, such as temperature, operating frequency, operating voltage, power consumption, operating modes of SCVRs, and/or inter-core communication activity, etc.

The logic 140 may in turn instruct the VR 130, power source 120, and/or individual components of system 100 (such as the cores 106) to modify their operations. For example, logic 140 may indicate to the VR 130 and/or power source 120 (or PSU (Power Supply Unit)) to adjust their output or mode. In some embodiments, logic 140 may request the cores 106 to modify their operating frequency, power consumption, etc. Additionally, even though components 140 and 150 are shown to be included in processor 102-1, these components may be provided elsewhere in the system 100. For example, power control logic 140 may be provided in the VR 130 (which may be an on-die SCVR in an embodiment), in the power source 120, directly coupled to the interconnection 104, within one or more (or alternatively all) of the processors 102, outside of computing device/system (e.g., as a standalone device), coupled to (or integrated with) the power source 120, etc.

Figure 2:
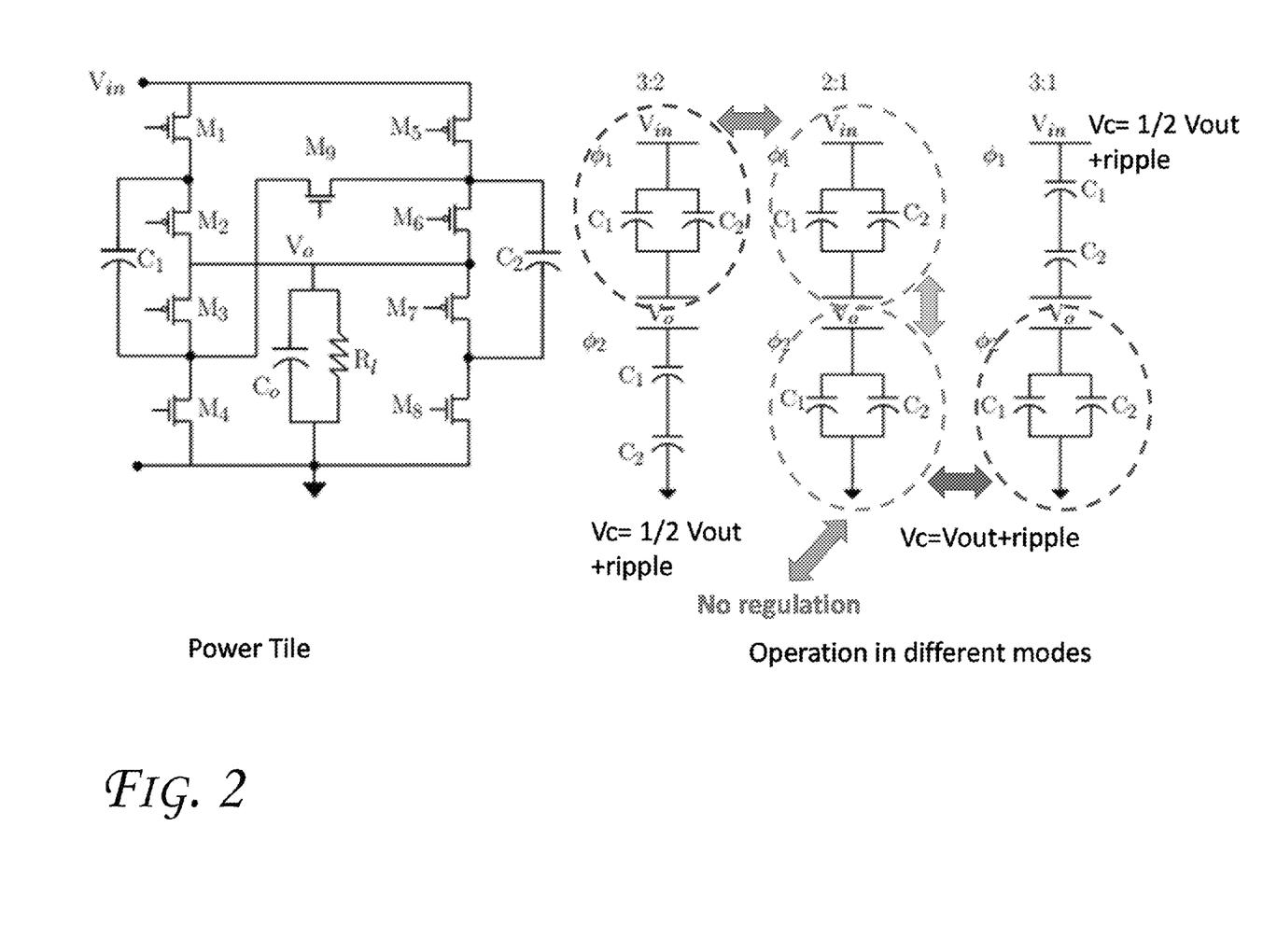
FIG. 2 illustrates a circuit diagram of a switching capacitor voltage regulator that may be utilized in various embodiments.

FIG. 2 illustrates a circuit diagram of an SCVR that may be utilized in various embodiments. The power tile is shown on the left side of FIG. 2, while operations in three different modes are shown on the right side of FIG. 2. The middle mode (2:1) has no regulation, while the left mode (3:2) has a ½ Vout plus ripple regulation for Vc, and the right mode (3:1) has Vout (or $V_O$) plus ripple for Vc. Moreover, the SCVR in each mode switches between two states where the flying capacitors (C1 and C2) are connected in parallel or series, and are in series or disconnected from the input. The flying capacitors are connected to the load (at $V_O$). The 3:2 mode and 2:1 mode have one state in common, and the 2:1 and 3:1 mode also have one state in common. Hence, while changing states, the mode transition is synchronized with the change of modes through a common state.

Figure 3:
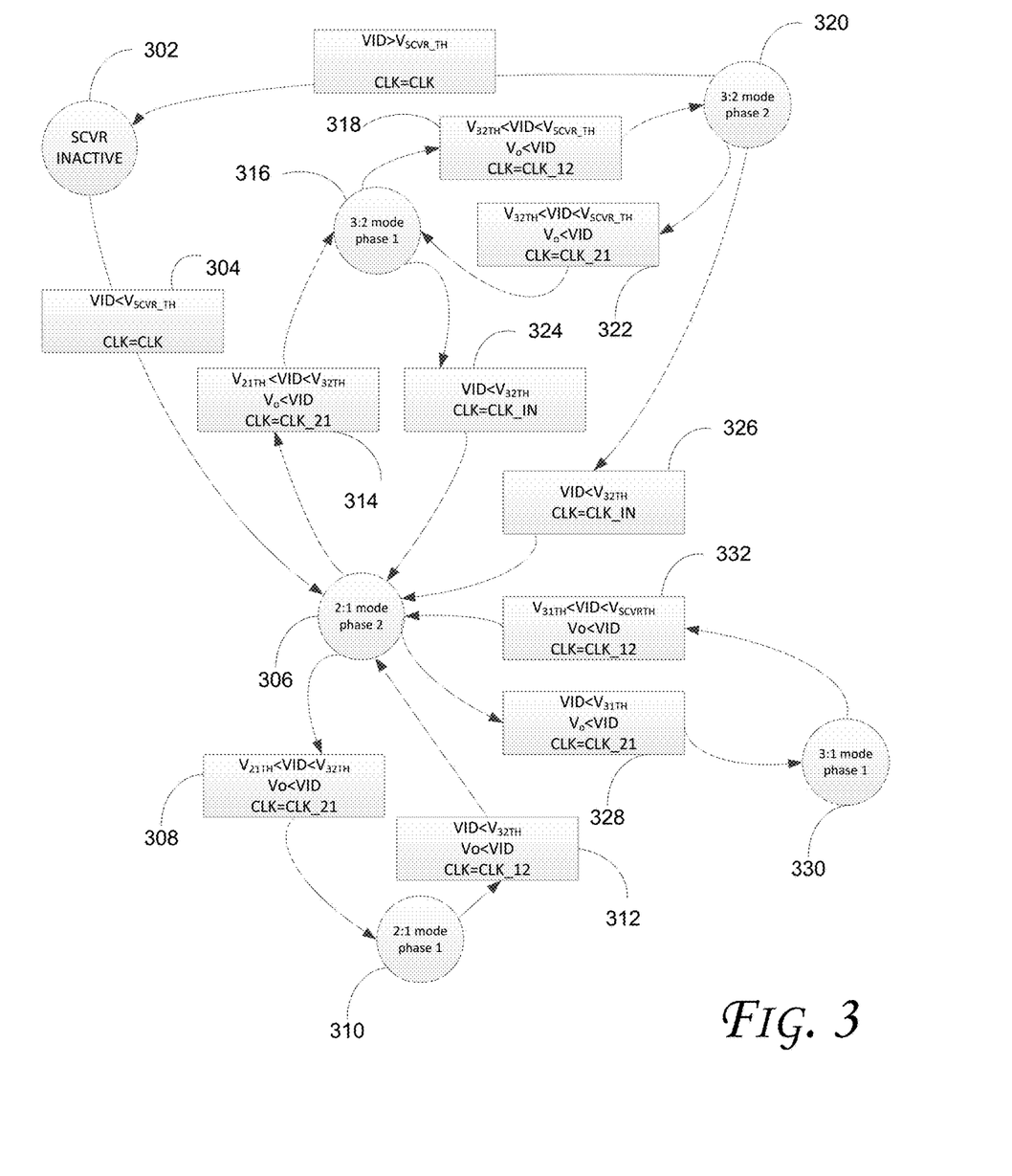
FIG. 3 illustrates a state diagram for provision of a low ripple mechanism of mode change in a switching capacitor voltage regulator, accordingly to an embodiment.

FIG. 3 illustrates a state diagram for provision of a low ripple mechanism of mode change in a SCVR, accordingly to an embodiment. In one embodiment, the state diagram of FIG. 3 shows how the clock signal may be changed depending on the mode transition. Various operations discussed with reference to FIG. 3 may be performed by one or more components discussed herein with reference to the other figures such as the logic 140 and/or VR 130.

Referring to FIGS. 2 and 3, in each mode the SCVR switches between phase 1 ($\phi$1, shown on top of FIG. 2) and phase 2 ($\phi$2, shown at the bottom of FIG. 3). The output voltage sensing is through a clocked comparator and flop mechanism which toggles its output whenever Vout<VID, where VID is the reference voltage. The comparator input clock has a period of TCLK_IN. When this comparator and flop output (referred to as comparator output clock from here onwards) is 0, the SCVR is in phase 2. When it is 1, the SCVR is in phase 1. This clock is a clock of variable frequency and duty cycle, but it has a minimum period of 2*TCLK_IN. It also has a phase shift from the input clock equal to the comparator delay (assumed to less than ½ TCLK_IN). Using the comparator output clock, two clocks CLK_12 (rising edge during phase 1 to phase 2 transition) and CLK_21 (rising edge during phase 2 to phase 1 transition) are generated.

Additionally, in case all SCVR mode changes occur as phase transitions that would occur in a single mode, any voltage (or current) spikes on the output node or the capacitor will not occur. We can change the mode using CLK_12 and CLK_21 to change modes along with the phase. In some cases, the change is done through an intermediate state between the two states.

Referring to FIG. 3, a sample state diagram is shown according to one embodiment. More particularly, after SCVR exits an inactive state (302), VID is compared with a threshold voltage ($V_{SCVR\_TH}$) (304) and the clock signal is set to the input clock signal (CLK=CLK) and 2:1 mode, phase 2 is entered (306). After state 306, states 308, 314, or 328 may be entered depending on the comparison of VID with various voltage threshold values as shown. After state 308, 2:1 mode is, phase 1, is entered (310), followed by VID comparisons as shown in 312 where clock is set to CLK_12. After state 314, 3:2 mode, phase 1, is entered (316) which may go on to 318 or 324 based on VID comparisons, followed by states 320/326, 320/322/316, and 306, as shown. After state 328, 3:1 mode, phase 1 is entered (330), followed by state 332 and back to 306.

Figure 4:
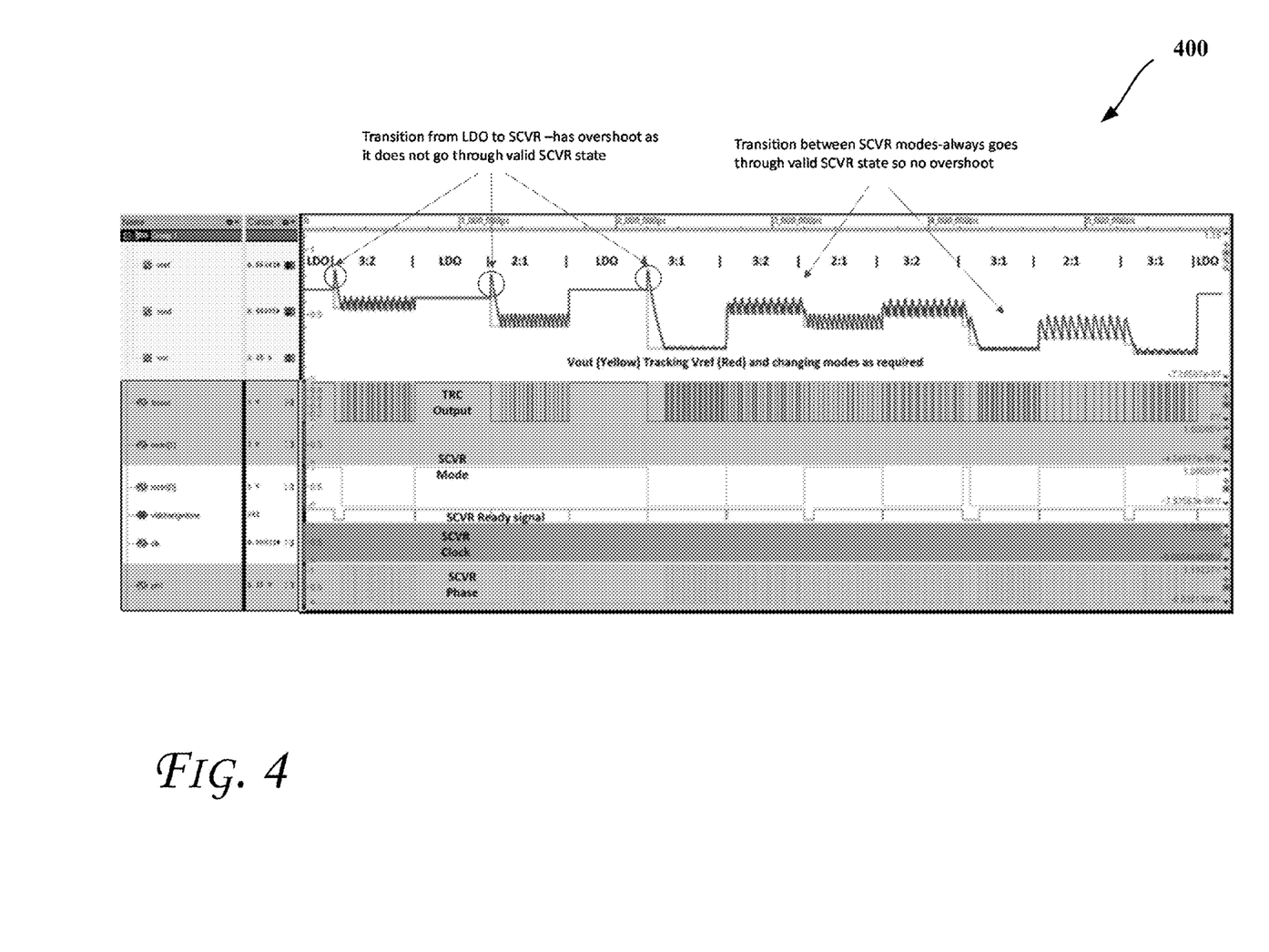
FIG. 4 shows a sample wave form showing transitions between modes of a switching capacitor voltage regulator, according to an embodiment.

Using the state transition diagram of FIG. 3, a sample output waveform and its transitions is shown in FIG. 4. As shown, when the SCVR is in LDO mode, it is acting as a decoupling capacitor to a parallel LDO. When it transitions to an SCVR mode, it does not go through a valid SCVR state with the correct voltages on the flying capacitors. Hence, we can see an overshoot. This can be compared to the lack of overshoot when the SCVR switches modes using embodiments discussed herein. In an embodiment, the SCVR could be always operating as an SCVR (without the LDO mode), so there will never be any overshoot.

More specifically, FIG. 4 shows a sample wave form showing transitions between modes of an SCVR, according to an embodiment. As shown, Vout never has any overshoot or undershoot voltage (or current) spikes in cases where states go through a proper sequence. Vout has spikes in the case where no sequencing is used.

In case the load current is very high and the SCVR cannot support the output voltage in is operating mode, the comparator switches every input clock cycle. In this case, the period of the comparator output clock will be equal to half the period of the comparator input clock. If this situation persists for a (e.g., threshold) number of clock cycles, the mode is incremented/changed to the next higher mode to better support the load current.

By contrast, one simple solution would be to use a larger decoupling capacitor, but such a solution may not always be possible due to cost or area. Further, in most SCVR implementations, on-die capacitance is reduced due to use of MIM or device capacitance as flying capacitors as previously discussed.

Figure 5:
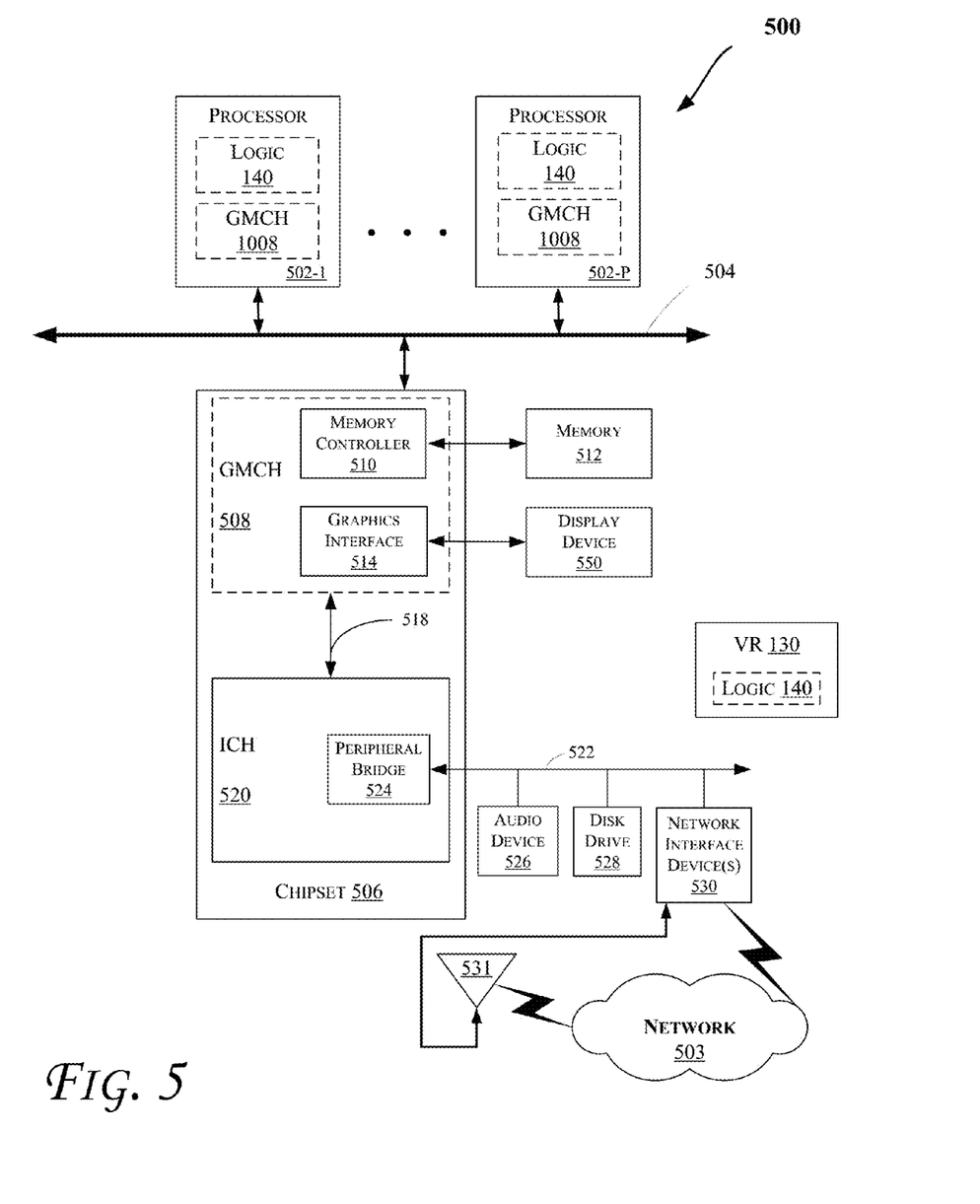

FIG. 5 illustrates a block diagram of a computing system 500 in accordance with an embodiment. The computing system 500 may include one or more central processing unit(s) (CPUs) or processors 502-1 through 502-P (which may be referred to herein as "processors 502" or "processor 502"). The processors 502 may communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die.

Also, the processors 502 with a multiple core design may be implemented as symmetrical or asymmetrical multiprocessors. In an embodiment, one or more of the processors 502 may be the same or similar to the processors 102 of FIG. 1. In some embodiments, one or more of the processors 502 may include one or more of the cores 106, logic 140, and sensor(s) 150, of FIG. 1. Also, the operations discussed with reference to FIGS. 1-4 may be performed by one or more components of the system 500. For example, a voltage regulator (such as VR 130 of FIG. 1) may regulate voltage supplied to one or more components of FIG. 5 at the direction of logic 140.

A chipset 506 may also communicate with the interconnection network 504. The chipset 506 may include a graphics and memory control hub (GMCH) 508. The GMCH 508 may include a memory controller 510 that communicates with a memory 512. The memory 512 may store data, including sequences of instructions that are executed by the processor 502, or any other device included in the computing system 500. In one embodiment, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a display device 550, e.g., a graphics accelerator. In one embodiment, the graphics interface 514 may communicate with the display device 550 via an accelerated graphics port (AGP) or Peripheral Component Interconnect (PCI) (or PCI express (PCIe) interface). In an embodiment, the display device 550 (such as a flat panel display (such as an LCD (Liquid Crystal Display), a cathode ray tube (CRT), a projection screen, etc.) may communicate with the graphics interface 514 through, for example, a signal converter that translates a digital representation of an image stored in a storage device such as video memory or system memory into display signals that are interpreted and displayed by the display. The display signals produced may pass through various control devices before being interpreted by and subsequently displayed on the display device 550.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the processor 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and one or more network interface device(s) 530 (which is in communication with the computer network 503). Other devices may communicate via the bus 522. Also, various components (such as the network interface device 530) may communicate with the GMCH 508 in some embodiments. As shown, the network interface device 530 may be coupled to an antenna 531 to wirelessly (e.g., via an Institute of Electrical and Electronics Engineers (IEEE) 802.11 interface (including IEEE 802.11a/b/g/n, etc.), cellular interface, 3G, 3G, LPE, etc.) communicate with the network 503. Other devices may communicate via the bus 522. In addition, the processor 502 and the GMCH 508 may be combined to form a single chip. Furthermore, the graphics accelerator may be included within the GMCH 508 in other embodiments.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 500 may be arranged in a point-to-point (PtP) configuration. For example, processors, memory, and/or input/output devices may be interconnected by a number of point-to-point interfaces.

Figure 6:
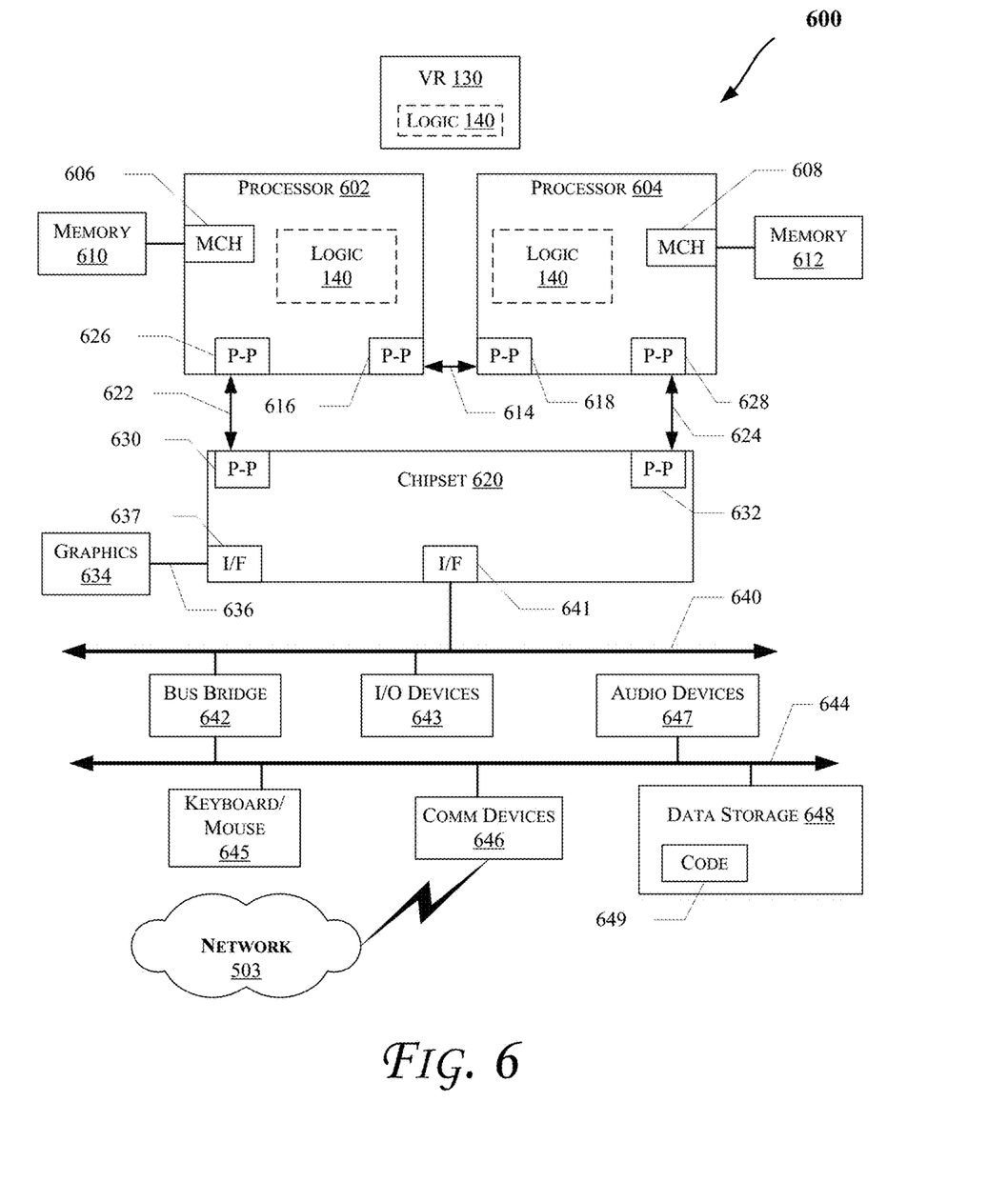

FIG. 6 illustrates a computing system 600 that is arranged in a point-to-point (PtP) configuration, according to an embodiment. In particular, FIG. 6 shows a system where processors, memory, and input/output devices are interconnected by a number of point-to-point interfaces. The operations discussed with reference to FIGS. 1-5 may be performed by one or more components of the system 600. For example, a voltage regulator (such as VR 130 of FIG. 1) may regulate voltage supplied to one or more components of FIG. 6 at the direction of logic 140.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5. Also, the processors 602 and 604 may include one or more of the cores 56, logic 140, and/or sensor(s) 150 of FIG. 1.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

In at least one embodiment, one or more operations discussed with reference to FIGS. 1-6 may be performed by the processors 602 or 604 and/or other components of the system 600 such as those communicating via a bus 640. Other embodiments, however, may exist in other circuits, logic units, or devices within the system 600 of FIG. 6. Furthermore, some embodiments may be distributed throughout several circuits, logic units, or devices illustrated in FIG. 6.

Chipset 620 may communicate with the bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device, and/or a data storage device 648. The data storage device 648 may store code 649 that may be executed by the processors 602 and/or 604.

Figure 7:
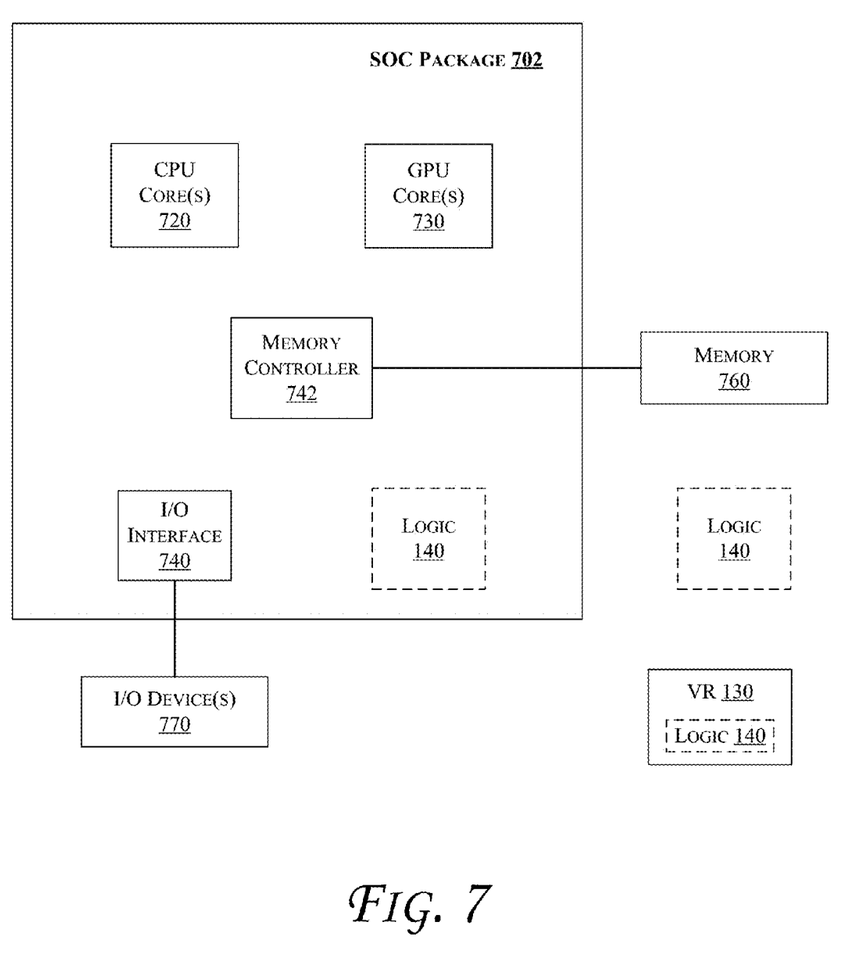

In some embodiments, one or more of the components discussed herein can be embodied as a System On Chip (SOC) device. FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 (which may be similar to or the same as memory discussed herein with reference to the other figures) via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like. Furthermore, SOC package 702 may include/integrate the logic 140 in an embodiment. Alternatively, the logic 140 may be provided outside of the SOC package 702 (i.e., as a discrete logic).

The following examples pertain to further embodiments. Example 1 includes an apparatus comprising: logic, at least a portion of which is in hardware, to cause a mode change of a Switching Capacitor Voltage Regulator (SCVR) based at least in part on a comparison of an output voltage of the SCVR and a reference voltage, wherein the output voltage is to be sensed based at least in part on a clock signal. Example 2 includes the apparatus of example 1, wherein the logic is to cause the mode change of the SCVR between a first phase and a second phase based at least in part on the comparison of the output voltage of the SCVR and the reference voltage and at least one of a first clock signal, corresponding to the first phase, and a second clock signal corresponding to the second phase. Example 3 includes the apparatus of example 2, wherein the first clock signal and the second clock signal are to be generated based at least in part on the clock signal. Example 4 includes the apparatus of example 1, wherein the clock signal has a variable frequency and duty cycle. Example 5 includes the apparatus of example 1, wherein the logic is to dynamically cause the mode change based at least in part on a switching frequency of the SCVR. Example 6 includes the apparatus of example 1, wherein the mode change includes a change to one of: 2:1, 3:1, or 3:2 step down modes. Example 7 includes the apparatus of example 1, wherein the SCVR is to comprise at least one Metal Insulator Metal (MIM) capacitor. Example 8 includes the apparatus of example 1, wherein the mode change is a low ripple mode change. Example 9 includes the apparatus of example 1, wherein the mode change is a low ripple mode change with no voltage or current spikes. Example 10 includes the apparatus of example 1, wherein one or more of: the logic, a processor having one or more processor cores, and memory are on a single integrated circuit.

Example 11 includes a method comprising: causing a mode change of a Switching Capacitor Voltage Regulator (SCVR) based at least in part on a comparison of an output voltage of the SCVR and a reference voltage, wherein the output voltage is sensed based at least in part on a clock signal. Example 12 includes the method of example 11, wherein causing the mode change of the SCVR is to be performed between a first phase and a second phase based at least in part on the comparison of the output voltage of the SCVR and the reference voltage and at least one of a first clock signal, corresponding to the first phase, and a second clock signal corresponding to the second phase. Example 13 includes the method of example 12, further comprising generating the first clock signal and the second clock signal based at least in part on the clock signal. Example 14 includes the method of example 11, further comprising dynamically causing the mode change based at least in part on a switching frequency of the SCVR. Example 15 includes the method of example 11, wherein causing the mode change includes causing a change to one of: 2:1, 3:1, or 3:2 step down modes. Example 16 includes the method of example 11, wherein the mode change is a low ripple mode change with no voltage or current spikes.

Example 17 includes a computing system comprising: a processor having one or more processor cores to execute one or more instructions to be stored in memory; and logic, at least a portion of which is in hardware, to cause a mode change of a Switching Capacitor Voltage Regulator (SCVR) based at least in part on a comparison of an output voltage of the SCVR and a reference voltage, wherein the output voltage is to be sensed based at least in part on a clock signal. Example 18 includes the system of example 17, wherein the logic is to cause the mode change of the SCVR between a first phase and a second phase based at least in part on the comparison of the output voltage of the SCVR and the reference voltage and at least one of a first clock signal, corresponding to the first phase, and a second clock signal corresponding to the second phase. Example 19 includes the system of example 18, wherein the first clock signal and the second clock signal are to be generated based at least in part on the clock signal. Example 20 includes the system of example 17, wherein the clock signal has a variable frequency and duty cycle. Example 21 includes the system of example 17, wherein the logic is to dynamically cause the mode change based at least in part on a switching frequency of the SCVR. Example 22 includes the system of example 17, wherein the mode change includes a change to one of: 2:1, 3:1, or 3:2 step down modes. Example 23 includes the system of example 17, wherein the SCVR is to comprise at least one Metal Insulator Metal (MIM) capacitor. Example 24 includes the system of example 17, wherein the mode change is a low ripple mode change with no voltage or current spikes. Example 25 includes the system of example 17, wherein one or more of: the logic, the processor, and the memory are on a single integrated circuit.

Example 26 includes an apparatus comprising means to perform a method as set forth in any preceding example. Example 27 comprises machine-readable storage including machine-readable instructions, when executed, to implement a method or realize an apparatus as set forth in any preceding example.

In various embodiments, the operations discussed herein, e.g., with reference to FIGS. 1-7, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-7.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:
1. An apparatus comprising:
logic, at least a portion of which is in hardware, to cause a mode change of a Switching Capacitor Voltage Regulator (SCVR) based at least in part on a comparison of an output voltage of the SCVR and a reference voltage, wherein the output voltage is to be sensed based at least in part on a clock signal, wherein the SCVR in each of a plurality of step down modes is to switch between two states, wherein, while changing between the two states, a transition of the mode change of the SCVR is to be synchronized through a common state.

2. The apparatus of claim 1, wherein the logic is to cause the mode change of the SCVR between a first phase and a second phase based at least in part on the comparison of the output voltage of the SCVR and the reference voltage and at least one of a first clock signal, corresponding to the first phase, and a second clock signal corresponding to the second phase.

3. The apparatus of claim 2, wherein the first clock signal and the second clock signal are to be generated based at least in part on the clock signal.

4. The apparatus of claim 1, wherein the clock signal has a variable frequency and duty cycle.

5. The apparatus of claim 1, wherein the logic is to dynamically cause the mode change based at least in part on a switching frequency of the SCVR.

6. The apparatus of claim 1, wherein the mode change includes a change to one of: 2:1, 3:1, or 3:2 step down modes.

7. The apparatus of claim 1, wherein the SCVR is to comprise at least one Metal Insulator Metal (MIM) capacitor.

8. The apparatus of claim 1, wherein the mode change is a low ripple mode change.

9. The apparatus of claim 1, wherein the mode change is a low ripple mode change with no voltage or current spikes.

10. The apparatus of claim 1, wherein one or more of: the logic, a processor having one or more processor cores, and memory are on a single integrated circuit.

11. A method comprising:
  causing a mode change of a Switching Capacitor Voltage Regulator (SCVR) based at least in part on a comparison of an output voltage of the SCVR and a reference voltage,
  wherein the output voltage is sensed based at least in part on a clock signal, wherein the SCVR in each of a plurality of step down modes switches between two states, wherein, while changing between the two states, a transition of the mode change of the SCVR is synchronized through a common state.

12. The method of claim 11, wherein causing the mode change of the SCVR is to be performed between a first phase and a second phase based at least in part on the comparison of the output voltage of the SCVR and the reference voltage and at least one of a first clock signal, corresponding to the first phase, and a second clock signal corresponding to the second phase.

13. The method of claim 12, further comprising generating the first clock signal and the second clock signal based at least in part on the clock signal.

14. The method of claim 11, further comprising dynamically causing the mode change based at least in part on a switching frequency of the SCVR.

15. The method of claim 11, wherein causing the mode change includes causing a change to one of: 2:1, 3:1, or 3:2 step down modes.

16. The method of claim 11, wherein the mode change is a low ripple mode change with no voltage or current spikes.

17. A computing system comprising:
  a processor having one or more processor cores to execute one or more instructions to be stored in memory; and
  logic, at least a portion of which is in hardware, to cause a mode change of a Switching Capacitor Voltage Regulator (SCVR) based at least in part on a comparison of an output voltage of the SCVR and a reference voltage, wherein the output voltage is to be sensed based at least in part on a clock signal, wherein the SCVR in each of a plurality of step down modes is to switch between two states, wherein, while changing between the two states, a transition of the mode change of the SCVR is to be synchronized through a common state.

18. The system of claim 17, wherein the logic is to cause the mode change of the SCVR between a first phase and a second phase based at least in part on the comparison of the output voltage of the SCVR and the reference voltage and at least one of a first clock signal, corresponding to the first phase, and a second clock signal corresponding to the second phase.

19. The system of claim 18, wherein the first clock signal and the second clock signal are to be generated based at least in part on the clock signal.

20. The system of claim 17, wherein the clock signal has a variable frequency and duty cycle.

* * * * *